March 22, 1955 G. SCHWESINGER 2,704,484
AUTOFOCUSING DEVICE
Filed Sept. 8, 1951 3 Sheets-Sheet 3
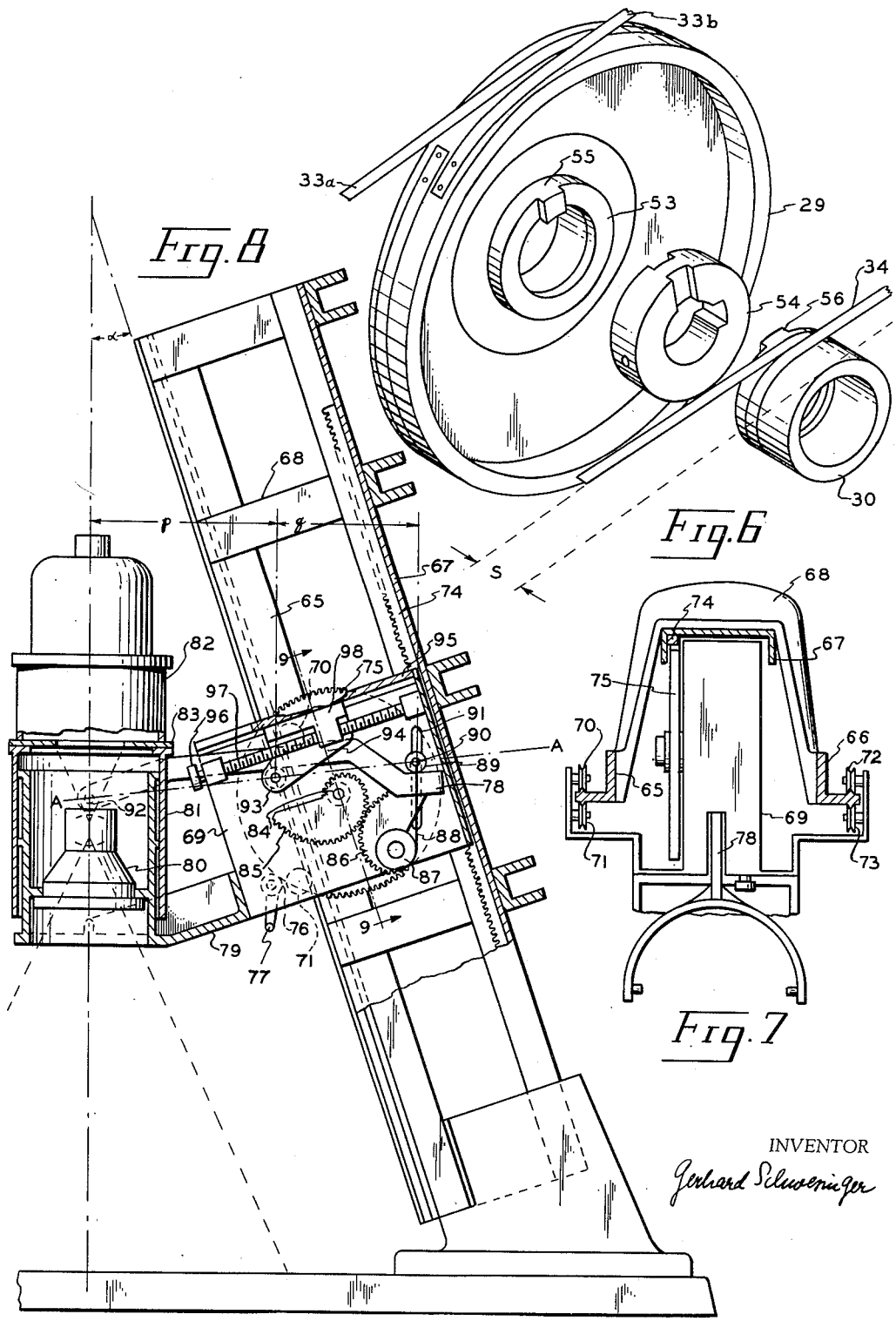
INVENTOR
Gerhard Schwesinger

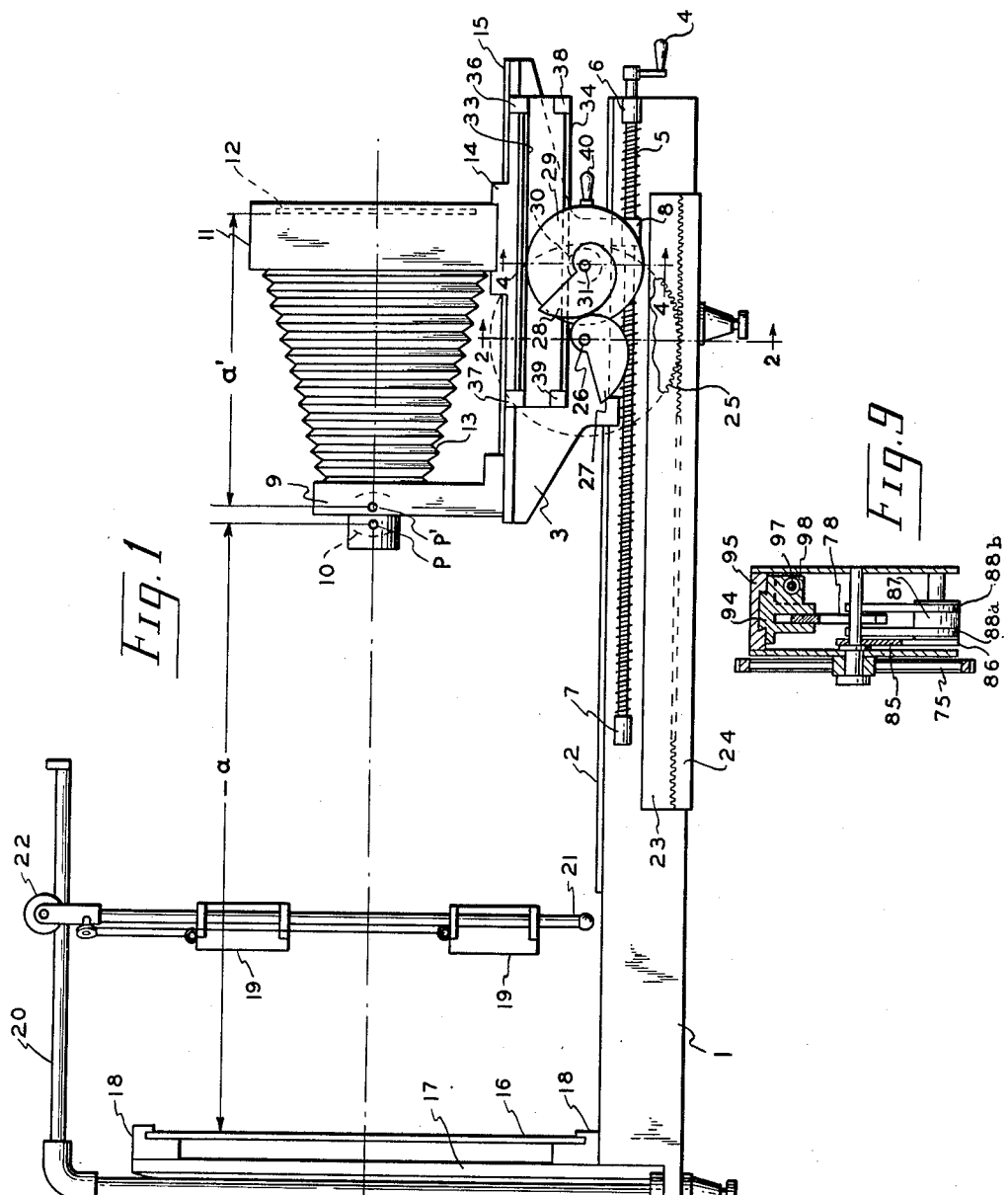

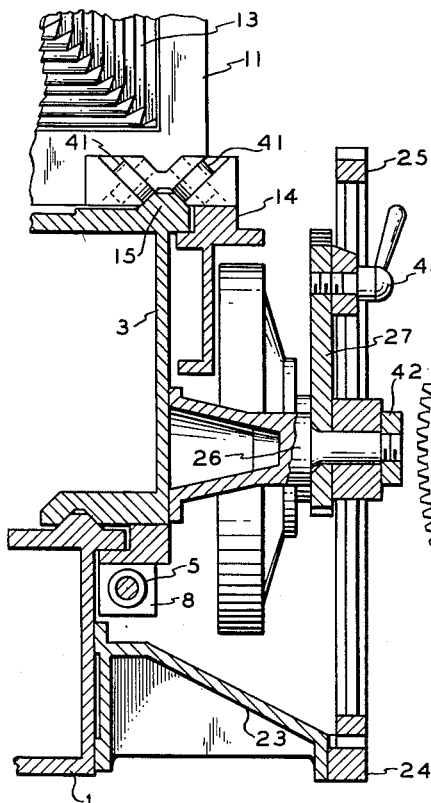
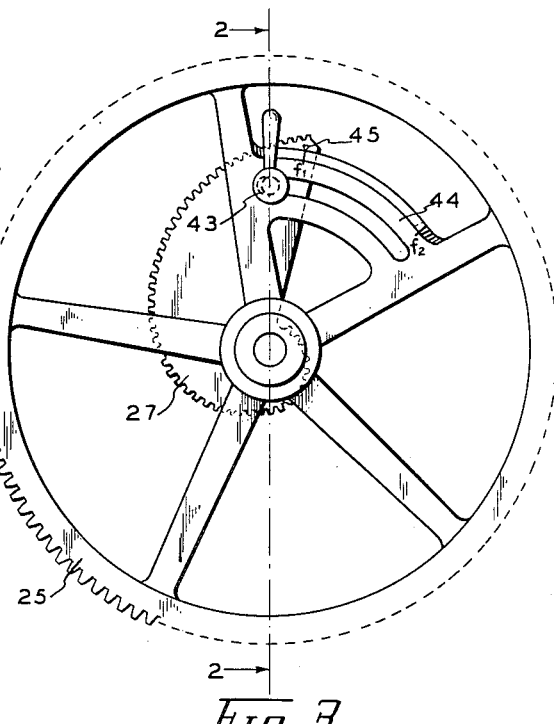
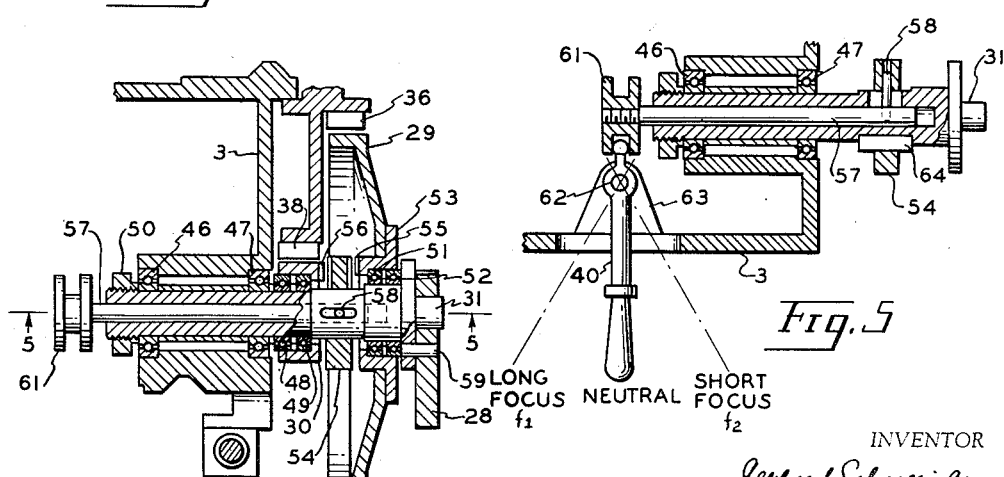

United States Patent Office 2,704,484
Patented Mar. 22, 1955

2,704,484

AUTOFOCUSING DEVICE

Gerhard Schwesinger, Little Silver, N. J.

Application September 8, 1951, Serial No. 245,656

6 Claims. (Cl. 88—24)

The present invention relates to automatic lens focusing devices, frequently referred to as inverters. The purpose of these devices is to automatically establish in an optical system composed of an object plane, a lens and an image plane, the theoretical relationship governing the relative positions of these three elements within a certain range of magnifications and reductions. This theoretical relationship can be expressed in different ways, depending on how the positions of the object plane and the image plane are determined relative to the lens. If the locations of the object and image plane are measured from the principal planes of the lens such that $a$ is the object distance and $a'$ the image distance, the theoretical relation is $$\frac{1}{a'} - \frac{1}{a} = \frac{1}{f}$$

where $f$ is the focal length of the lens. If the object and image distances are measured from the front and rear focal point of the lens, respectively, and denoted by $x$ and $x'$, one has $$xx' = -f^2$$

If a point halfway between object and image plane is defined such that its equal distances from the object and image plane are denoted by $p-f$ and its distance from the lens by $p'$, one has $$p^2 - p'^2 = f^2$$

Various inverters have been suggested on the basis of one of these three equations which define an equiaxial hyperbola if the two variable optical distances are taken as rectangular coordinates. The known inverters employ either geometrical linkages or arrangements of cams to satisfy one of the preceding equations.

Certain disadvantages inherent to these devices limit their usefulness. Inevitable friction tends to cause self-jamming of most inverters at certain magnification or reduction ratios associated with near-by dead centers, great slope angles of cams or the like. For this reason the usable range of inverters of the geometrical linkage type is usually not more than 0.4:2.5. If cams are employed, the range can be extended to one side only, either for magnification or reduction. Otherwise the slope angle of the cams would become forbiddingly great on the other side. Thus, for instance, focusing cams are used within a fairly wide magnification range in photographic enlargers which are not required to produce images in a reduced scale.

Another disadvantage of known inverters lies in the fact that they either cannot be used at all or only with difficulties for different focal lengths. In inverters of the geometrical linkage type a change of focal length would require a scaling up or down of the whole geometrical configuration. This is possible only in one exceptional case of such an inverter, but even then at least four different adjustments are necessary to effect the focal length change. Cam inverters in general can be used only for one fixed focal length.

Still another disadvantage of known inverters lies in the direct and strict dependence of their dimensions on the required focal length. Very short or especially very long focal lengths may entail dimensions which are inconvenient from the mechanical viewpoint.

A further disadvantage inherent to cam inverters is that in the apparatus to be focused the cam, even if perfectly accurate, can be misplaced relative to the cam follower in three different ways, each one resulting in focusing errors.

It is the object of the invention to provide an inverter which is free from the above mentioned disadvantages. The invention incorporates a kinematical train consisting of a plurality of rotary members. In this train the first and last member perform rotary motions which, if considered as rectangular coordinates, define an equiaxial hyperbola, this relationship hereafter being briefly referred to as hyperbolic. Further, contacting members of this train perform a purely rolling motion relative to each other such that there is no sliding friction in the contact points. Consequently, this mechanism is practically free from any tendency of self-jamming, resulting in a wide operating range. As rolling motion is involved, the active faces of contacting members can be geared. In a preferred embodiment of the invention, the hyperbolic relation is produced by kinematical pairs of congruent noncircular members. Such congruent noncircular kinematical pairs with purely rolling motion are known for different purposes. For instance, elliptical gear pairs are sometimes used if a periodically varying gear ratio is desired. Also, an inverter has been suggested employing congruent noncircular gears whose effective pitch curves are Archimedean spirals. However, such gears cannot mesh directly and correctly, due to the fact that an Archimedean spiral fails to satisfy the kinematical conditions required for the pitch curve of noncircular gears. In order to couple the motions of these gears, the suggested inverter provides for intermediate rotary members which slide, while being loaded, on oblique shafts. Besides introducing harmful sliding friction, this device does not realize the hyperbolic relationship as required for exact focusing. It is only an approximate solution, applicable with limited accuracy in a small operating range.

According to the present invention, the preceding lens equations can be exactly satisfied by using a special degenerate form of noncircular gears belonging to a certain class which also comprises elliptical gears. Further, two linear relations are correctly established, one between the angular motion of the first member of the pair and the optical distances chosen, the other between the angular motion of the second member and said optical distances. In order to achieve this, the kinematical train in addition is provided with known mechanical devices which transform, at a uniform rate, a rectilinear motion into a rotary motion, or conversely, as rack and pinion, or tape and drum.

These and further objects of the invention will be understood from the specification and the accompanying drawings in which Fig. 1 is a side view of a camera for reproduction work, illustrating one embodiment of the invention.

Fig. 2 is a fragmentary cross section along line 2—2 of Fig. 1, but with the noncircular member 27 rotated clockwise by 120 degrees.

Fig. 3 is a view of the first noncircular member and its actuating gear, illustrating their relative adjustment.

Fig. 4 is a fragmentary cross section along line 4—4 of Fig. 1.

Fig. 5 is a section along line 5—5 of Fig. 4 and perpendicular to the section of Fig. 4.

Fig. 6 is an expanded perspective view of the drum and tape arrangement and the jaw clutch.

Fig. 7 illustrates a second embodiment of the invention, specifically, a cross section through the carriage guide of a photographic enlarger with autofocusing means for variable focal lengths.

Fig. 8 is partially a side view of partially a longitudinal section through the enlarger.

Fig. 9 is a cross section through the carriage along line 9—9 of Fig. 8.

In Fig. 1, 1 is the camera base provided with V-guide 2 along which the slide 3 can be moved. The motion is introduced by turning crank 4 of lead screw 5 which is supported in the base at 6 and 7 and acts on slide 3 through nut 8. Slide 3 carries the fixed lens support 9 with lens 10 and the movable camera back 11 which contains a ground glass 12 for the observation of the image and means to retain a plate or film holder during the exposure. A light-tight bellows 13 connects this support 9 and camera back 11, the latter being mounted on a carriage 14 which moves along V-guide 15 of slide 3. At the end of base 1 an easel 16 is mounted on the supporting structure 17 by means of the brackets 18. The object on the easel is illuminated by four lamps whose fixtures 19 are suspended in pairs from a rotatable arm 20 such that they can be symmetrically moved up and down along rod 21, the latter being movable on arm 20 by means of roller 22. Along one side of base 1, a bracket 23 is mounted which supports a rack 24. Engaging this rack, a gear 25 (which for clarity is drawn to show only the pitch circle and a part of the geared rim) is mounted on an axle 26 fixed on slide 3. In a manner to be discussed later, the gear 25 imparts its rotary motion to the first noncircular member 27 which engages with the second member 28. Both members 27 and 28 are of equal shape and geared. For clarity the gear teeth are not shown however. The motion of the second gear 28 is transmitted to either one of the two co-axial drums 29, 30, by means of a jaw clutch to be described later. Gear 28 and drums 29 and 30 are mounted on the shaft 31 which is also supported in slide 3. Flexible steel tapes 33 and 34 are wound on the drums 29 and 30, respectively, such that if one end of the tape is unwound from the drum, the other end is taken up, no slip occurring between tape and drum. The ends of the tapes are attached to blocks 36, 37, 38, and 39, which are mounted on the carriage 14 and may be provided with well known means not illustrated for adjusting the tape tension and for initially setting the camera back 11 in correct relation to the lens 10. 40 is a lever to be explained in connection with Fig. 5. P and P' are the front and rear nodal points, respectively. $a$ and $a'$ are the object and image distances, respectively, the former counted negative as it lies to the left of the lens.

Fig. 2 shows how one side of carriage 14 rolls along the V-guide 15 on anti-friction bearings 41. It also shows the gear 25 which engages rack 24 attached to the bracket 23. When rolling on the rack, gear 25 revolves on axle 26, the nut 42 preventing axial shift. The first noncircular gear 27, mounted on the same axle, is adjustably coupled to the motion of gear 25 by a clamping bolt 43.

In Fig. 3, a slot is drawn in a bridge 44 connecting two consecutive spokes of gear 25. The clamping bolt 43 passes through this slot so that the angle subtended by the slot determines the range within which the gear 27 can be adjusted relative to gear 25. Thus, the triangular index mark 45 on gear 27 can be set on either one of two marks $f_1$ and $f_2$ provided on bridge 44.

In Fig. 4, the shaft 31 is mounted on slide 3 by means of two ball bearings 46, 47. On shaft 31 two other ball bearings 48, 49 are provided which carry the drum 30. By means of nut 50 and spacing rings between the ball bearings, the whole assembly is fixed in the axial direction. Two further ball bearings 51, 52 carry the hub 53 of drum 29. Thus both drums may rotate independently of shaft 31. However, either one can be coupled to the rotation of the shaft by means of a jaw clutch mechanism, consisting of clutch body 54, which has two square radial grooves on its end faces, and two jaws 55, 56 on the adjacent end faces of hub 53 and drum 30, respectively. If coupled, the jaws fit snugly into the grooves so that any backlash is prevented. The clutch body 54 can be axially shifted by means of a movable rod 57 which is accommodated in the hollow portion of shaft 31. A pin 58 is fastened near the end of rod 57, such that it passes through a slot in shaft 31 and engages the clutch body 54. The driver 27 is fastened to a flange on shaft 31 by screws (not shown) and secured by dowel pin 59.

Fig. 5 illustrates the connection of rod 57 with the clutch body 54 through pin 58. If rod 57 is axially shifted from the neutral position shown to the right, the clutch engages the large drum 29. A shift to the left engages the small drum 30. The shift is effected by turning the lever 40 whose rounded end fits into the square groove of part 61, the latter being fastened to rod 57. Lever 40 swings around joint 62 whose stationary member is a lug 63 on slide 3. Torque is transmitted from shaft 31 to the clutch body 54 through a snugly fitting key 64.

Fig. 6 shows more clearly the details of the clutch consisting of jaw 55 on hub 53, of jaw 56 on drum 30 and of the clutch body 54. It also shows the arrangement of the steel tapes which transform the rotary motion of the follower 28 into the translatory motion of carriage 14. On drum 29 the tape consists of two pieces 33a and 33b, which are wound side by side in opposite directions and whose inner ends are fastened to the drum surface. This arrangement permits a rotation of drum 29 of somewhat less than one revolution which is just sufficient for the type of link illustrated in Figs. 1 and 3. As the linear travel of both tapes 33, 34 is equal, drum 30, due to its smaller diameter, will, if uncoupled, perform more than one full revolution. This is possible if, for instance, a one-piece tape 34 is wound in, at least, one full turn around drum 30, the tape edges of adjacent windings in contact. If the tape is under sufficient tension, ample torque can be transmitted without slip. As the straight portions of the tape are not parallel to the motion of the carriage 14, the tape ends are attached to the blocks 38 and 39, with a relative lateral displacement which is equal to the tape width multiplied by the number of turns which would be necessary to wind the total length of the tape on drum 30. If crank 4 is turned such that slide 3 moves away from the easel, gears 25 and 27 rotate clockwise. Thus the second noncircular gear 28 and one of the drums, if coupled, rotate anticlockwise, moving the tape-drawn carriage 14 toward the lens. This is necessary to keep the image in focus. Further, according to the invention, the kinematical pair which consists of the congruent members 27 and 28 effects a transformation of the motion such that if $\varphi$ (rad) is the angle of rotation of the first member, $\varphi'$ (rad) the angle of rotation of the second member, both counted from simultaneous zero values, the following hyperbolic relation exists $$\left(1-\frac{K}{b}\varphi\right)(1+Kb\varphi')=1 \qquad (1)$$

where $b$ is the square root of the maximum transmission ratio and $K$ the tangent of the maximum slope angle of the contact curve. According to the invention, two suitable linear relations are established, one between the angular motion of the first train member and the object and/or image distance, the other between the angular motion of the last train member and the object and/or image distance. Specifically, in the present embodiment, $$\varphi=\frac{2}{D}(a_0-a) \qquad (2)$$

$$\varphi'=\frac{2}{d}(a_0'-a') \qquad (3)$$

where $D$ is the pitch diameter of gear 25 and $d$ the diameter of that drum which is just active. The constants $a_0$ and $a_0'$, which relate the zero positions of the rotary members 27 and 28 to specific positions of object and image, are given the values $$a_0=\frac{\sqrt{D}}{2K}(b\sqrt{D}-\sqrt{d}) \qquad (4)$$

$$a_0'=\frac{\sqrt{d}}{2K}\left(\sqrt{D}-\frac{\sqrt{d}}{b}\right) \qquad (5)$$

Using the last four relations, one obtains from the above given transformation law (1)

$$\frac{1}{a'}-\frac{1}{a}=\frac{2K}{\sqrt{Dd}} \qquad (6)$$

Comparing this with the first form of the lens equation listed in the beginning, it appears that the described device acts as inverter for a focal length $$f=\frac{\sqrt{Dd}}{2K} \qquad (7)$$

The device is adapted to lenses of different focal length by changing either $D$ or $d$ or both. In the present embodiment, $d$ is changed by the use of two different drums 29, 30, whose diameters are about 4:1. Thus the focal length is changed in a ratio of about 2:1.

To effect the focal length change, say, from the long focal length $f_1$ to the short focal length $f_2$, two steps are necessary after the change of the lens. First, the clamping bolt 43 is loosened so that slide 3 can be moved without changing the position of gear 27. Fixed position of this gear, according to Eq. 2, implies a constant difference $a_0-a$. As the transition from the drum diameter $d_1$ to the smaller diameter $d_2$ entails an increase of $a_0$ by $f_1-f_2$ according to Eqs. 4 and 7, the distance $a$ must be increased by the same amount. Hence, slide 3 must be moved toward the easel by the amount $f_1-f_2$. This condition is reached if, after an anticlockwise rotation of gear 25, the index mark 45 on gear 27 coincides with the mark $f_2$ on bridge 44. In this latter position of gear 25 the clamping bolt 43 is tightened again. It is seen that the adjustment of gear 25 relative to gear 27 is proportional to the focal length.

Secondly, lever 40 is shifted to the neutral position. Both drums thus being disengaged, the carriage 14 can be moved by hand into such a position that engagement of the clutch with the small drum 30 is possible by moving lever 40 to $f_2$-position. It is to be understood, of course, that the drum and tape drives are pre-adjusted with regard to the carriage 14 such as to produce a sharp image at a certain conjugate ratio. Then sharp imagery will be automatically maintained for any other magnification within the operating range of the autofocusing device.

In a second embodiment of the invention, Fig. 7 illustrates a cross section through the supporting structure of a photographic enlarger, consisting of two angle rails 65, 66, and a U-rail 67, all three joined by a number of braces 68 to form a rigid structure. A carriage 69 is movable along this structure on four rollers 70, 71, 72, 73. A rack 74 is attached to U-rail 67. Gear 75 whose shaft (not shown) is supported in the carriage 69 engages rack 74 and rolls thereon during the travel of the carriage. 78 is a forked lever to be explained later.

In Fig. 8 the position of two carriage rollers 70, 71 is indicated on the carriage 69. A support 79 for the interchangeable lens mount 80 is rigidly fixed to carriage 69. On the tubular part of support 79 a slidable sleeve 81 is mounted, carrying the housing 82 in which well known means for the illumination of the negative are accommodated. In a slot between sleeve 81 and housing 82 the negative frame 83 can be interposed.

When pinion 76 which meshes with gear 75 is turned by means of hand crank 77, gear 75 rolls on the fixed rack 74, thereby moving carriage 69 up or down. The rolling motion of gear 75 is transmitted through gear shaft 84 to the first noncircular gear 85 which in turn engages the second noncircular gear 86, the latter preferably of identical shape. On a drum 87, connected to gear 86 and rotating with the latter, the end of a flexible steel tape 88 is attached whose other end is linked to the axle 89 of roller 90. The squared ends of the axle 89 slide in slots 91 which are parallel to the optical axis. Roller 90 is in contact with a flat surface at the end of lever 78 whose forked other end is linked to sleeve 81 by two pins 92. The fulcrum of lever 78 is movable and represented by the center of roller 93 which contacts another flat surface on lever 78 machined such that the centers of the pins 92 and the rollers 90 and 93 lie exactly in one straight line, marked A—A.

Thus, if the fulcrum is held fixed, the displacement of sleeve 81 is exactly proportional to the motion of tape 88, and, hence, to the rotation of the gear 87. Roller 93 is supported between two lugs of slide 94 which can be moved in the dovetail guide 95 by turning lead screw 96 on knob 97. Nut 98 couples the lead screw 96 to slide 94.

Fig. 9 shows more clearly some details. For symmetry, the above mentioned steel tape consists of two parallel acting pieces 88a, 88b, arranged on either side of lever 78.

The guide of carriage 69 includes an angle $\alpha$ with the optical axis. Consequently, the distance by which gear 75 rolls on rack 74 is $1/\cos \alpha-$ times larger than the corresponding displacement of the lens relative to the easel. If D is the pitch diameter of gear 75, then, regarding imagery, the "effective" diameter to be used in Equation 7 is $D \cos \alpha$. Further, as the output motion is modified by the lever ratio $p:q$, the "effective" diameter of drum 87 is $$\frac{p}{q}d$$

$d$ being the diameter of the drum itself. Thus the described device focuses a lens of the focal length $$f=\frac{1}{2K}\sqrt{\frac{pdD \cos \alpha}{q}}$$

As $p:q$ is continuously variable within a certain range, the device acts as inverter for arbitrary focal lengths. It is of course to be understood that means not illustrated, but equivalent to those shown in Fig. 3, are provided to adjust the lens and negative support, after a change of focal length, relative to the kinematical pair 85, 86. Also, in order to reduce the forces in the focusing mechanism, means not illustrated may be provided to balance, at least partly, the weight of housing 82.

It is further to be understood that various modifications may be made in the structures above described, without in any way departing from the spirit of the invention. Thus, for instance, instead of the specified gear and rack, or drum and tape drives, any device may be used which transforms rotary into translatory motion, or conversely, at a uniform rate. Also, force-closed rotary elements such as ungeared cams, or any other kinematical equivalent, may be used for the hyperbolic transformation. Also, instead of controlling the positions of object and image stage relative to the lens, the positions of any two of these elements may be controlled relative to the third one. Thus it may often preferable to control the lightest or most easily movable elements relative to the heaviest one.

I claim:

1. In an optical system capable of accommodating interchangeable lenses of different focal length, including as its optical elements an object stage, an image stage, and a lens, said elements being capable of relative rectilinear motion, means for moving two of said elements rectilinearly in such relationship as to maintain sharp imagery, said means comprising a pair of noncircular rotary elements interengaging along contact curves the radius vector of which changes in an inverse proportion to a term additively composed of the square of the polar angle and a constant, thereby to establish a hyperbolic relationship between the angular motions of said noncircular elements, and means for converting at different fixed transmission ratios said angular motions into rectilinear displacements of any two of the optical elements relative to the third, thereby to permit the use of one and the same pair of noncircular elements for maintaining sharp imagery at any conjugate ratio of lenses of different focal length upon selecting the value of the transmission ratio in accordance with the focal length of the lens.

2. In an optical system capable of accommodating lenses whose focal length may vary within a continuous range, including as its optical elements an object stage, an image stage, and a lens, said elements being capable of relative rectilinear motion, means for moving two of said elements rectilinearly in such relationship as to maintain sharp imagery, said means comprising a pair of noncircular rotary elements interengaging along contact curves whose radius vector changes in an inverse proportion to a term additively composed of the square of the polar angle and a constant, thereby to establish a hyperbolic relationship between the angular motions of said rotary elements, means for converting at a uniform rate said angular motions into rectilinear displacements, linkages for magnifying or reducing at a uniform rate at least one of said rectilinear displacements, at least one of the movable optical elements receiving said magnified or reduced rectilinear displacement, the remaining unchanged rectilinear displacement being directly imparted to the remaining optical element, said linkages comprising movable fulcrums to produce a continuously variable conversion ratio between the angular motions of the noncircular elements and the magnified or reduced rectilinear displacements produced by said linkages, thereby permitting the use of one and the same pair of noncircular elements for maintaining sharp imagery at any conjugate ratio with lenses of any focal length upon moving said fulcrums to positions selected in accordance with the focal length of the lens.

3. In an optical system according to claim 1 a pair of noncircular rotary elements with smooth peripheral surfaces whose radius vector changes in an inverse proportion to a term additively composed of the square of the polar angle and a constant, said noncircular elements being in contact and interengaging along said peripheral surfaces with a rolling motion relative to each other.

4. In an optical system according to claim 1 a pair of geared noncircular rotary elements meshing with each other in the manner of ordinary circular gears, the gearing of said noncircular elements being generated along pitch curves whose radius vector changes in an inverse proportion to a term additively composed of the square of the polar angle and a constant.

5. In an optical system according to claim 2 a pair of noncircular rotary elements with smooth peripheral surfaces whose radius vector changes in an inverse proportion to a term additively composed of the square of the polar angle and a constant, said noncircular elements being in contact and interengaging along said peripheral surfaces with a rolling motion relative to each other.

6. In an optical system according to claim 2 a pair of geared noncircular rotary elements meshing with each other in the manner of ordinary circular gears, the gearing of said noncircular elements being generated along pitch curves whose radius vector changes in an inverse proportion to a term additively composed of the square of the polar angle and a constant.

References Cited in the file of this patent

UNITED STATES PATENTS 1,235,685   Hansch _____ Aug. 7, 1917